United States Patent
Park et al.

(10) Patent No.: US 9,160,432 B2
(45) Date of Patent: Oct. 13, 2015

(54) COGNITIVE RADIO BASE STATION AND COMMUNICATION METHOD THEREOF IN MULTI-USER MULTIPLE-INPUT MULTIPLE OUTPUT COGNITIVE RADIO NETWORK SYSTEM

(75) Inventors: Jae Hyun Park, Busan (KR); Byung Jang Jeong, Daejeon (KR); Sung Hyun Hwang, Daejeon (KR); Jung Sun Um, Daejeon (KR); Hoi Yoon Jung, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 470 days.

(21) Appl. No.: 13/469,566

(22) Filed: May 11, 2012

(65) Prior Publication Data

US 2012/0289266 A1   Nov. 15, 2012

(30) Foreign Application Priority Data

May 12, 2011   (KR) ........................ 10-2011-0044463

(51) Int. Cl.
*H04W 72/00* (2009.01)
*H04B 7/04* (2006.01)
*H04B 7/06* (2006.01)
*H04W 16/14* (2009.01)

(52) U.S. Cl.
CPC ............ *H04B 7/0452* (2013.01); *H04B 7/0617* (2013.01); *H04W 16/14* (2013.01)

(58) Field of Classification Search
CPC ............ H04W 72/082; H04W 72/087; H04W 88/085; H04L 25/03343; H04L 1/0003; H04L 2025/03426; H04L 25/0204; H04L 1/0009; H04L 2025/03414; H04L 2025/0342; H04L 2025/03802; H04L 25/022
USPC ........................................................ 455/501
See application file for complete search history.

(56) References Cited

U.S. PATENT DOCUMENTS

| | | | |
|---|---|---|---|
| 2006/0050655 A1* | 3/2006 | Shi et al. | 370/254 |
| 2007/0268181 A1* | 11/2007 | Howard et al. | 342/368 |
| 2008/0166974 A1* | 7/2008 | Teo et al. | 455/67.11 |
| 2009/0207735 A1* | 8/2009 | Ben Letaief et al. | 370/237 |
| 2011/0159881 A1* | 6/2011 | Shin et al. | 455/450 |

FOREIGN PATENT DOCUMENTS

KR   1020100113262 A   10/2010

OTHER PUBLICATIONS

Antti Tölli; et al; "Minimum SINR Maximization for Multiuser MIMO Downlink with Per BS Power Constraints", In Wireless Communications and Networking Conference, 2007. WCNC 2007. Hong Kong IEEE (Mar. 2007), pp. 1144-1149.

* cited by examiner

*Primary Examiner* — Ajibola Akinyemi
(74) *Attorney, Agent, or Firm* — Ladas & Parry LLP

(57) ABSTRACT

A communication method for a cognitive radio (CR) base station in a multi-user multiple-input multiple-output (MIMO) CR communication system including the CR base station and CR terminals, may include calculating, from an interference channel, an orthogonal projection matrix to be used for removing interference on a primary user through use of a zero forcing (ZF) processing scheme, and obtaining a beamforming weight vector for each of the CR terminals, through use of the orthogonal projection matrix.

19 Claims, 11 Drawing Sheets

COGNITIVE RADIO BASE STATION AND COMMUNICATION METHOD THEREOF IN MULTI-USER MULTIPLE-INPUT MULTIPLE OUTPUT COGNITIVE RADIO NETWORK SYSTEM

CROSS-REFERENCE TO RELATED APPLICATION

This application claims the benefit of Korean Patent Application No. 10-2011-0044463, filed on May 12, 2011, in the Korean Intellectual Property Office, the disclosure of which is incorporated herein by reference.

BACKGROUND

1. Field of the Invention

The present invention relates to a cognitive radio (CR) base station in a multi-user multiple-input multiple output (MIMO) CR communication system, and a communication method for the CR base station.

2. Description of the Related Art

As a number of data communication services increases, a usable frequency through which a service is readily provided is becoming saturated. A cognitive radio (CR) communication technology enables a secondary communication system, for which use of a predetermined frequency band is not allowed, to use the predetermined frequency hand under a condition that the secondary communication system does not interfere with communication being performed by a primary communication system, for which use the predetermined frequency band is allowed, is not using the corresponding frequency band.

In a CR communication environment, utilization of a degree of spatial freedom through a multi-antenna is needed so as to more effectively use a limited usable frequency, to increase a data transmission rate, and to not send interference on communication of a primary communication system.

Accordingly, a multiple-input multiple-output (MIMO)-based beamforming scheme in which a CR base station and CR terminals use multi-antennas may be considered.

However, a beamforming scheme that maximizes a minimum signal-to-interference- and noise ratio (SINR) of a CR terminal without giving interference from the CR terminal on a primary communication system, may need an optimization process that requires a complex iteration process to obtain a beamforming weight. Therefore, there is a desire for a beamforming weight vector obtaining method that has less complexity than the beamforming scheme, maximizes the minimum SINR, and increases a channel capacity of a CR system, and a power controlling method thereof.

SUMMARY

An aspect of the present invention provides a cognitive radio (CR) base station and a communication method for the CR base station that is capable of obtaining a beamforming weight vector at a low complexity so as to improve a channel capacity in a multi-user multiple-input multiple-output (MIMO) CR communication system.

Another aspect of the present invention also provides a CR base station and a communication method for the CR base station in a multi-user MIMO CR communication system that performs preprocessing for preventing interference from affecting a primary user in a CR communication system and performs power controlling.

According to an aspect of the present invention, there is provided a communication method for a CR base station in a multi-user MIMO CR communication system including the CR base station and CR terminals, the method including calculating, from an interference channel, an orthogonal projection matrix to be used for removing interference on a primary user through use of a zero forcing (ZF) processing scheme, and obtaining a beamforming weight vector for each of the CR terminals, through use of the orthogonal projection matrix.

The communication method may further include setting an intermediate matrix including an effective channel that is based on the orthogonal projection matrix, and noise among the CR terminals, and the obtaining may include obtaining the beamforming weight vector based on the intermediate matrix.

The communication method may further include computing a sub-matrix of a Q matrix by performing QR decomposition on the intermediate matrix including an effective channel that is based on the orthogonal projection matrix, and noise among the CR terminals, and the obtaining may include obtaining the beamforming weight vector through use of a right singular matrix that is based on the sub-matrix of the Q matrix.

The obtaining may include obtaining the beamforming weight vector based on the right singular matrix and the orthogonal projection matrix.

The obtaining may include obtaining a right singular vector corresponding to a maximum singular value of the right singular matrix, and obtaining the beamforming weight vector based on the right singular vector and the orthogonal projection matrix.

The obtaining may include obtaining the beamforming weight vector that maximizes a signal-to-leakage-and noise ratio (SLNR) for each of the CR terminals, based on the orthogonal projection matrix.

The obtaining may include obtaining the beamforming weight vector that maximizes an SLNR for each of the CR terminals, based on the orthogonal projection matrix and a singular vector corresponding to a maximum singular value of a matrix including noise among the CR terminals.

According to another aspect of the present invention, there is provided a communication method for a CR base station in a multi-user MIMO CR communication system including the CR base station and CR terminals, the method including calculating an orthogonal projection matrix based on an interference channel with respect to a first primary user included in a set of primary users, obtaining a beamforming weight vector for each of the CR terminals, based on the orthogonal projection matrix, determining whether the beamforming weight vector satisfies a leakage constraint generated from each primary user due to the beamforming weight vector for each of the CR terminals, and calculating an orthogonal projection matrix with respect to a first primary user that fails to satisfy a leakage constraint based on a result of the determination, and updating the beamforming weight vector through use of the orthogonal projection matrix with respect to the first primary user.

The updating may include calculating the orthogonal projection matrix based on a vector value corresponding to the first primary user when the beamforming weight vector for each of the CR terminals fails to satisfy a corresponding leakage constraint, and updating the beamforming weight vector based on the calculated orthogonal projection matrix.

The updating may include updating the set of primary users by adding the first primary user to the set of primary users when the beamforming weight vector for each of the CR terminals fails to satisfy a corresponding leakage constraint, recalculating the orthogonal projection matrix based on an interference channel with respect to the first primary user included in the updated set of primary users, and updating the beamforming weight vector based on the recalculated orthogonal projection matrix.

The communication method may further include setting an intermediate matrix through use of an effective channel that is based on the orthogonal projection matrix, and noise among the CR terminals, and the obtaining may include obtaining the beamforming weight vector based on the intermediate matrix.

The communication method may further include computing a sub-matrix of a Q matrix by performing QR decomposition on the intermediate matrix, and the obtaining may include obtaining the beamforming weight vector through use of a right singular matrix that is based on the sub-matrix of the Q matrix.

The obtaining may include obtaining the beamforming weight vector through use of the right singular matrix and the orthogonal projection matrix.

The obtaining may include obtaining a right singular vector corresponding to a maximum singular value of the right singular matrix, and obtaining the beamforming weight vector based on the right singular vector and the orthogonal projection matrix.

The obtaining may further include obtaining the beamforming weight vector that maximizes a signal-to-leakage- and noise ratio (SLNR) for each of the CR terminals, based on the orthogonal projection matrix.

According to still another aspect of the present invention, there is provided a communication method for a CR base station in a multi-user MIMO CR communication system including the CR base station and CR terminals, the method including obtaining a beamforming weight vector for each of the CR terminals, based on radio channels between the CR base station and the CR terminals, computing a first matrix defined based on signal-to-interference-and noise radios (SINRs) with respect to the beamforming weight vectors and power vectors of the CR terminals, and calculating a power vector optimized for each of the CR terminals, based on the first matrix.

The obtaining may include determining whether the power vector satisfies a leakage constraint and an interference constraint with respect to a primary user, updating the first matrix based on a result of the determination, and adjusting the power vector for each of the CR terminals, based on an eigenvector of the updated first matrix.

The communication method may further include setting an intermediate matrix based on the radio channels between the CR base station and the CR terminals, and noise among the CR terminals, and the obtaining may include obtaining the beamforming weight vector based on the intermediate matrix.

The communication method may further include calculating a sub-matrix of a Q matrix by performing QR decomposition on the intermediate matrix, and the obtaining may include obtaining the beamforming weight vector through use of a right singular matrix that is based on the sub-matrix of the Q matrix.

The obtaining may include obtaining a right singular vector corresponding to a maximum singular value of the right singular matrix, and obtaining the beamforming weight vector based on the right singular vector.

According to yet another aspect of the present invention, there is provided a CR base station in a multi-user MIMO CR communication system including the CR base station and CR terminals, the CR base station including a calculator to calculate, from an interference channel, an orthogonal projection matrix to be used for removing interference on a primary user, through use of a ZF processing scheme, and an obtaining unit to obtain a beamforming weight vector for each of the CR terminals, through use of the orthogonal projection matrix.

The CR base station may further include a sub-matrix calculator to compute a sub-matrix of a Q matrix by performing QR decomposition on an intermediate matrix including an effective channel that is based on the orthogonal projection matrix, and noise among the CR terminals, and the obtaining unit may obtain the beamforming weight vector through use of a right singular matrix that is based on the sub-matrix of the Q matrix.

According to further another aspect of the present invention, there is provided a CR base station in a multi-user MIMO CR communication system including the CR base station and CR terminals, the CR base station including a calculator to calculate an orthogonal projection matrix based on an interference channel with respect to a first primary user included in a set of primary users, an obtaining unit to obtain a beamforming weight vector for each of the CR terminals, through use of the orthogonal projection matrix, a determining unit to determine whether the beamforming weight vector satisfies a leakage constraint generated from each primary user due to the beamforming weight vector for each of the CR terminals, and an updating unit to calculate an orthogonal projection matrix with respect to a first primary user that fails to satisfy a leakage constraint based on a result of the determination, and to update the beamforming weight vector through use of the orthogonal projection matrix with respect to the first primary user.

According to still another aspect of the present invention, there is provided a CR base station in a multi-user MIMO CR communication system including the CR base station and CR terminals, the CR base station including an obtaining unit to obtain a beamforming weight vector for each of the CR terminals, based on radio channels between the CR base station and the CR terminals, a calculator to compute a first matrix defined based on SINRs with respect to the beamforming weight vectors and power vectors of the CR terminals, and a power vector calculator to compute a power vector optimized for each of the CR terminals, based on the first matrix.

The power vector calculator may include a determining unit to determine whether the power vector satisfies a leakage constraint and an interference constraint with respect to a primary user, an updating unit to update the first matrix based on a result of the determination, and an adjusting unit to adjust the power vector for each of the CR terminals, based on an eigenvector of the updated first matrix.

Additional aspects, features, and/or advantages of the invention will be set forth in part in the description which follows and, in part, will be apparent from the description, or may be learned by practice of the invention.

EFFECT

Exemplary embodiments of the present invention may readily obtain a beamforming vector through use of a closed-form solution, without iteration.

Exemplary embodiments of the present invention may maximize a signal-to-leakage- and noise ratio (SLNR) and thus, may increase a channel capacity of a cognitive radio (CR) system at a low complexity, without iteration.

Exemplary embodiments of the present invention may perform as many iterations as a number of maximum primary users and thus, a channel capacity of a CR system may be increased.

Exemplary embodiments of the present invention may obtain a power vector that maximizes a signal-to-interference-and noise ratio (SINR) for each of CR terminals and thus, a channel capacity of a CR system may be increased.

BRIEF DESCRIPTION OF THE DRAWINGS

These and/or other aspects, features, and advantages of the invention will become apparent and more readily appreciated from the following description of embodiments, taken in conjunction with the accompanying drawings of which.

DETAILED DESCRIPTION

Figure 1:
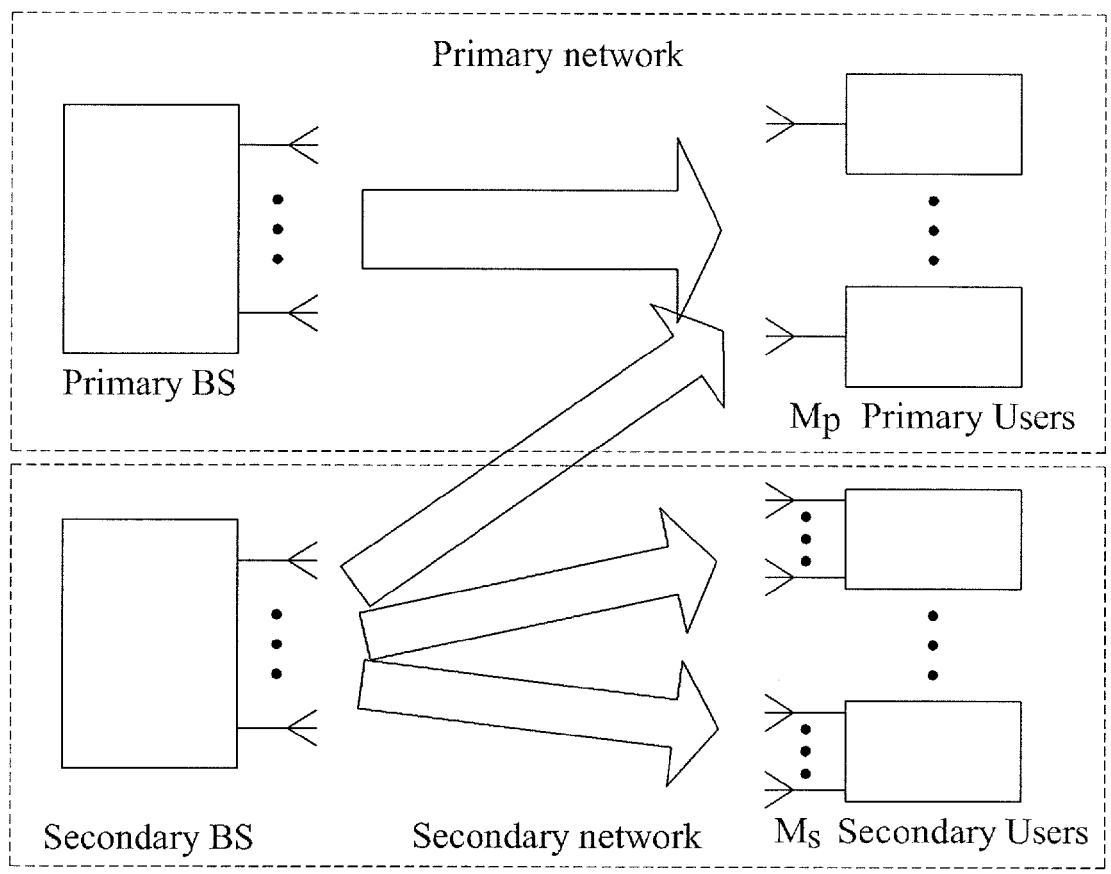
FIG. 1 is a diagram illustrating a system block of a cognitive radio (CR) network according to an embodiment of the present invention.

Reference will now be made in detail to embodiments of the present invention, examples of which are illustrated in the accompanying drawings, wherein like reference numerals refer to the like elements throughout. Embodiments are described below to explain the present invention by referring to the figures.

Hereinafter, a communication system that is allowed to use a predetermined band is referred to as a primacy communication system. A communication system that is not allowed to use the predetermined frequency band, but uses the predetermined frequency band through a cognitive radio (CR) communication when the primary communication system does not use the predetermined frequency band may be referred to as a secondary communication system or a CR communication system. The secondary communication system may use the predetermined frequency band of the primary communication system under a condition that the secondary communication system does not interfere with communication being performed by the primary communication system. A terminal of the primary communication system may be referred to as a primary user or terminal, and a terminal of the secondary communication system is referred to as a secondary user (SU) or terminal or a CR user or terminal.

FIG. 1 illustrates a system block of a CR network according to an embodiment of the present invention.

Referring to FIG. 1, an approved primary communication system and a non-approved secondary communication system exist in the same frequency band. A plurality of primary users may exist in the primary communication system, and a plurality of CR users having multi-antennas may exist in the secondary communication system. A base station having a multi-antenna in the secondary communication system, that is, a secondary base station or a CR base station, may take an environment that transmits different data to many CR terminals into consideration.

When a frequency flat fading channel is assumed to be used, a channel between a $m_P$th primary user and the secondary base station may be a channel $g_{m_P}$, a channel between a $m_S$th secondary user (SU) or CR user and the secondary base station may be a channel $H_{m_S}$. Accordingly, a signal $y_{m_S}$ that the $m_S$th SU or CR user receives from the secondary base station may be expressed by Equation 1.

$$y_{m_S} = H_{m_S} x + n_{m_S} \qquad \text{[Equation 1]}$$

Also, a signal y that an SU receives may be expressed by Equation 2.

$$y = Hx + n, \ y = \begin{bmatrix} y_1 \\ \vdots \\ y_{M_S} \end{bmatrix}, \ H = \begin{bmatrix} H_1 \\ \vdots \\ H_{M_S} \end{bmatrix} \qquad \text{[Equation 2]}$$

In this example, a beamforming transmission signal X may be expressed by Equation 3.

$$x = \sum_{m_S=1}^{M_S} w_{m_S} s_{m_S} \qquad \text{[Equation 3]}$$

In Equation 3, $w_{m_S}$ denotes a transmission beamforming weight vector for the $m_S$th SU, and $S_{m_S}$ denotes a data symbol to be transmitted to the $m_S$th SU.

Here, the transmission beamforming weight vector may satisfy a transmission power condition $P_T$ of the secondary base station and an interference constraint $\Gamma_{m_P}$ at each primary base station, as expressed by Equation 4 and Equation 5.

$$\sum_{m_S=1}^{M_S} \|w_{m_S}\|^2 \leq P_T \qquad \text{[Equation 4]}$$

In Equation 4, $P_T$ denotes a maximum transmission power of the secondary base station.

$$\sum_{m_S=1}^{M_S} |g_{m_P}^H w_{m_S}|^2 \le \Gamma_{m_P}, m_P = 1, \ldots, M_P, \quad \text{[Equation 5]}$$

$$m_s = 1, \ldots, M_s$$

In Equation 5, $g_{m_P}^H$ denotes a conjugate transpose of a channel $g_{m_P}$ between the $m_P$th primary user and the secondary base station, $w_{m_S}$ denotes a transmission beamforming weight vector for the $m_S$th SU, and $\Gamma_{m_P}$ denotes interference on each primary base station.

When Equation 3 is substituted to Equation 1, the signal $y_{m_S}$ received by $m_S$th SU or CR user from the secondary base station may be modified as expressed by Equation 6.

$$y_{m_S} = H_{m_S} w_{m_S} s_{m_S} + \sum_{\substack{m=1 \\ m \ne m_S}}^{M_S} w_m s_m + n_{m_S} \quad \text{[Equation 6]}$$

When $\bar{w}_{m_S}$ is assumed to be a reception beamforming weight vector for the $m_S$th SU, the SINR may be expressed by Equation 7.

$$SINR_{m_S} = \frac{|\bar{w}_{m_S}^H H_{m_S} w_{m_S}|^2}{\sum_{\substack{m=1 \\ m \ne m_S}}^{M_S} |\bar{w}_{m_S}^H H_{m_S} w_m|^2 + \sigma_n^2} \quad \text{[Equation 7]}$$

Here, $|\bar{w}_{m_S}^H H_{m_S} P_{N(G^H)} w_{m_S}'|$ denotes a signal, $$\sum_{\substack{m=1 \\ m \ne m_S}}^{M_S} |\bar{w}_{m_S}^H H_{m_S} P_{N(G^H)} w_m'|^2$$

denotes interference, and $\sigma_n^2$ denotes noise.

Accordingly, a minimum SINR maximizing beamforming problem that maximizes a minimum SINR may be expressed by Equation 8.

$$\text{maximize} \min_{m_S} \frac{|\bar{w}_{m_S}^H H_{m_S} w_{m_S}|^2}{\sum_{\substack{m=1 \\ m \ne m_S}}^{M_S} |\bar{w}_{m_S}^H H_{m_S} w_m|^2 + \sigma_n^2} \quad \text{[Equation 8]}$$

$$\text{subject to } \sum_{m_S=1}^{M_S} \|w_{m_S}\|^2 \le P_T, \|\bar{w}_{m_S}\|^2 = 1$$

$$\sum_{m_S=1}^{M_S} |g_{m_P}^H w_{m_S}|^2 \le \Gamma_{m_P}, m_P = 1, \ldots, M_P$$

An optimization problem such as Equation 8 does not have a closed-form solution and thus, may obtain a solution through a complex iterative algorithm. Accordingly, a complexity of the optimization problem may be significantly high.

It is because the SINR of the $m_S$th SU of Equation 7 may need to depend upon all $w_{m_S}$, $m_P=1, \ldots, M_P$, $m_s=1, \ldots, M_s$ and may need to satisfy an interference constraint at a primary user. Hereinafter, in advance of a method for solving the two constraints being described, an SINR and an SLNR are described with reference to FIGS. 2 and 3.

Figure 2:
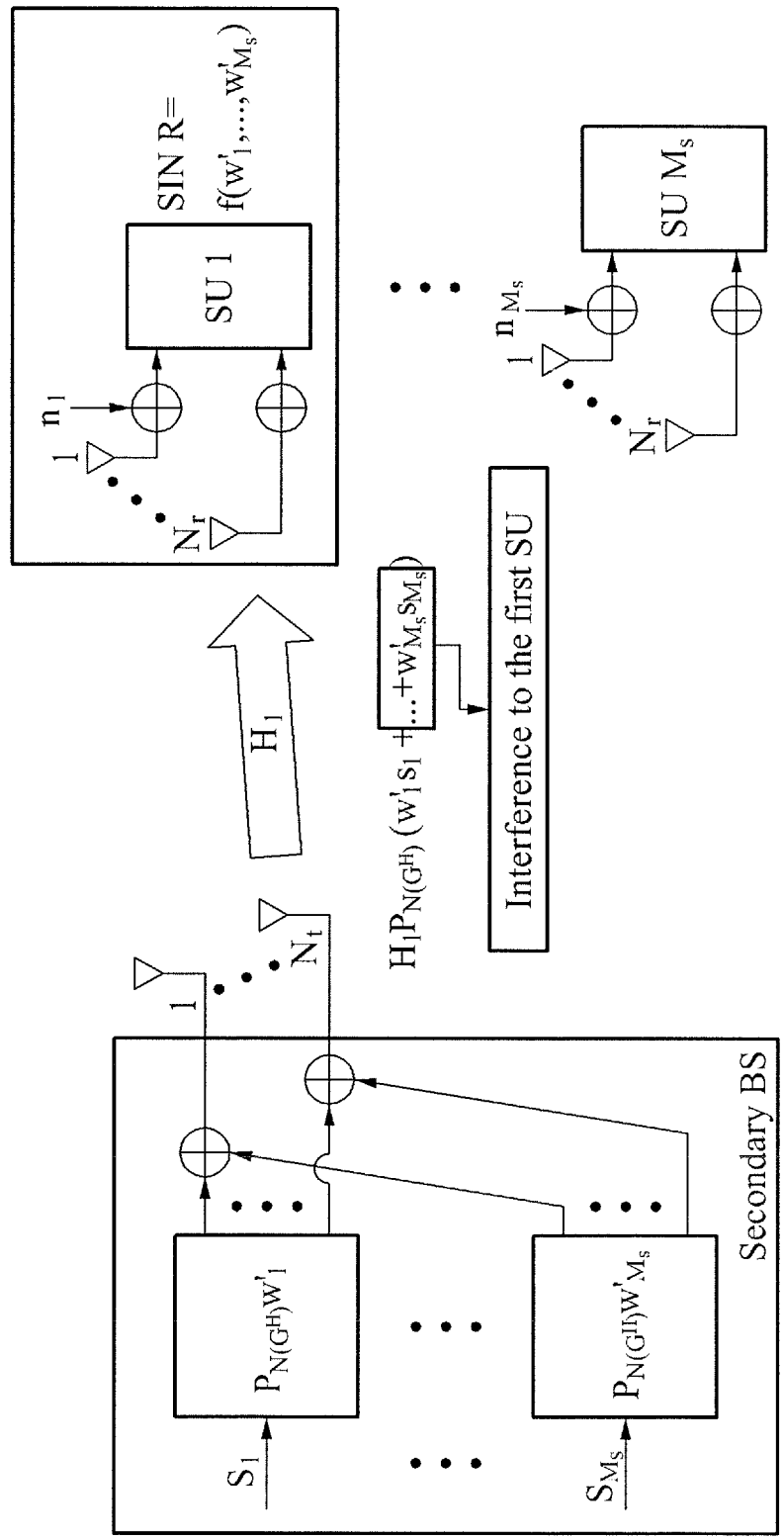
FIG. 2 is a diagram illustrating a signal-to-interference-and noise ratio (SINR) according to an embodiment of the present invention.
Figure 3:
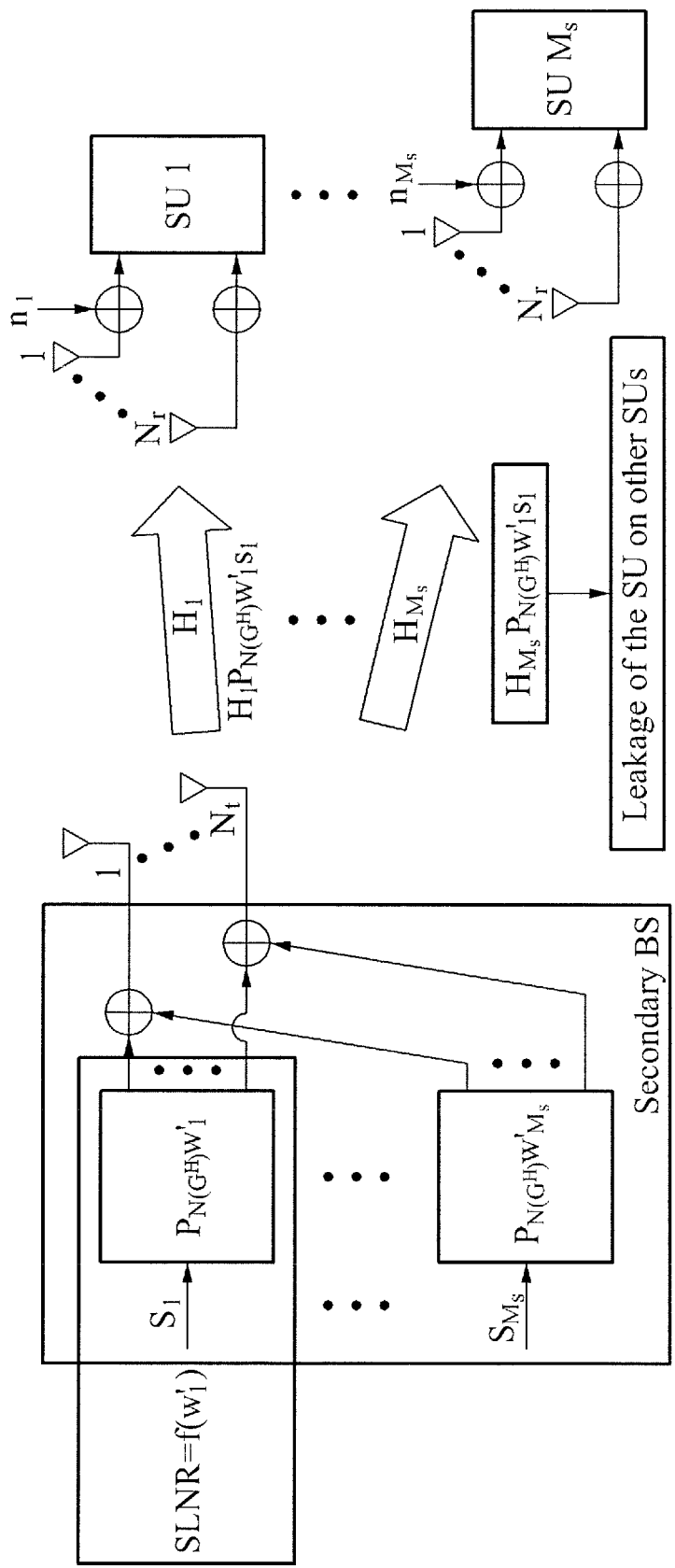
FIG. 3 is a diagram illustrating a signal-to-leak-and noise ratio (SLNR) according to an embodiment of the present invention.

FIG. 2 illustrates an SINR according to an embodiment of the present invention. FIG. 3 illustrates an SLNR according to an embodiment of the present invention.

In an SINR of FIG. 2, a signal transmitted to SUs by a secondary base station through a channel $H_1$ may be $H_{M_S} P_{N(G^H)}(w_1's_1 + \ldots + w_{M_S}'s_{M_S})$.

In this example, remaining signal components excluding a signal component $w_1's_1$ associated with a first SU (SU1), that is, $\ldots + w_{M_S}'s_{M_S}$, may act as interference on SU1.

Conversely, in an SLNR of FIG. 3, examples of a signal that the secondary base station transmits to SU1 may include a signal $H_1 P_{N(G^H)} w_1' s_1$ transmitted through the channel $H_1$ to SU1 and a signal $H_{M_S} P_{N(G^H)} w_1' s_1$ transmitted through a channel $H_{M_S}$ through an $M_S$th SU (SU $M_S$).

In this example, a signal $H_{M_S} P_{N(G^H)} w_1' s_1$ that is transmitted to SU $M_S$ through the channel $N_{M_S}$, although the secondary base station intends to transmit signal $H_{M_S} P_{N(G^H)} w_1' s_1$ to SU1, may act as a signal leakage associated with SU1 on other SUs.

Figure 4:
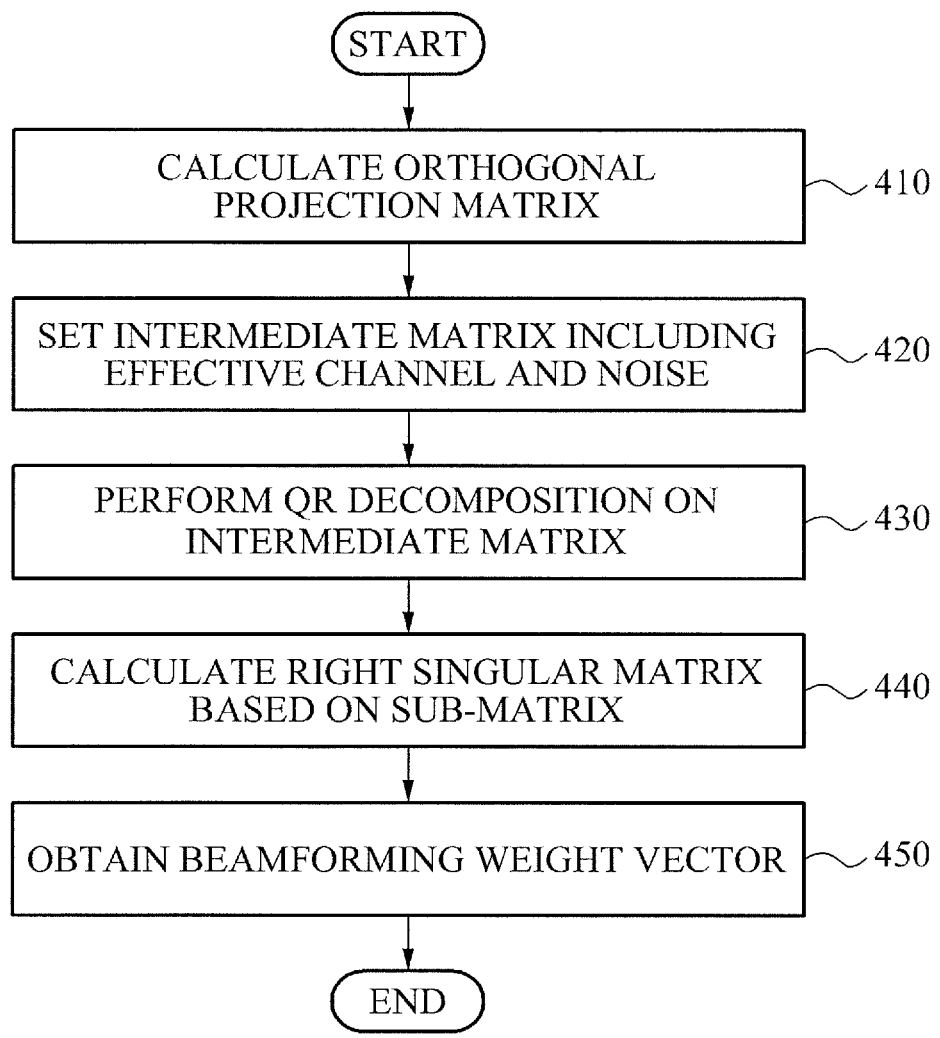
FIG. 4 is a flowchart illustrating a communication method for a CR base station in a multi-user multiple-input multiple-output (MIMO) CR communication system according to an embodiment of the present invention.
Figure 5:
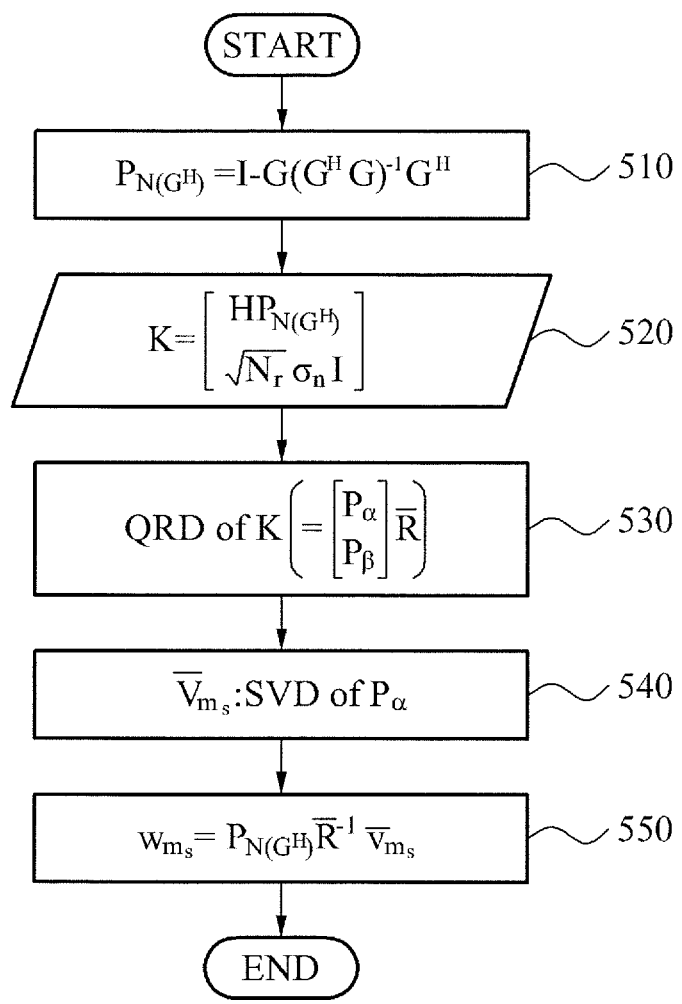
FIG. 5 is a flowchart illustrating the communication method of FIG. 4 in equation form.

FIG. 4 illustrates a communication method for a CR base station in a multi-user multiple-input multiple-output (MIMO) CR communication system according to an embodiment of the present invention. FIG. 5 illustrates the communication method of FIG. 4 in equation form.

An interference constraint with respect to a primary user may be satisfied through use of a linear zero forcing preprocessing scheme, hereinafter referred to as a ZF processing scheme.

That is, when an interference channel between a primary user and an SU is $G = [g_1, \ldots, g_{M_P}]$, and $w_{m_S}$, $m_s = 1, \ldots, M_s$, is projected to a null space of $G_H$, interference on the primary user may be removed. In this example, an orthogonal projection matrix $P_{N(G^H)}$ that is projected to the null space ($N(G^H)$) may be expressed by Equation 9.

$$P_{N(G^H)} = I - G(G^H G)^{-1} G^H \quad \text{[Equation 9]}$$

Therefore, $w_{m_S}$ may be expressed by Equation 10.

$$w_{m_S} = P_{N(G^H)} w_{m_S}' \quad \text{[Equation 10]}$$

In Equation 10, $w_{m_S}'$ may be a projected beamforming vector. When Equation 10 is substituted to Equation 7, an SINR may be expressed by Equation 11.

$$SINR_{m_S} = \frac{|\bar{w}_{m_S}^H H_{m_S} P_{N(G^H)} w_{m_S}'|^2}{\sum_{\substack{m=1 \\ m \ne m_S}}^{M_S} |\bar{w}_{m_S}^H H_{m_S} P_{N(G^H)} w_m'|^2 + \sigma_n^2} \quad \text{[Equation 11]}$$

In Equation 11, the interference constraint at the primary user may be satisfied by solving an optimization problem that maximizes an SINR with respect to an effective channel $H_{m_S} P_{N(G^H)}$. However, in Equation 11, all $w_{m_S}'$, $m_s = 1, \ldots, M_s$, still appear to be coupled with SINR. To overcome this, an SLNR may be defined by Equation 12.

$$SLNR_{m_S} = \frac{\|H_{m_S} P_{N(G^H)} w'_{m_S}\|^2}{\sum_{\substack{m=1 \\ m \neq m_S}}^{M_S} \|H_m P_{N(G^H)} w'_{m_S}\|^2 + N_r \sigma_n^2} \quad \text{[Equation 12]}$$

A difference between an SINR of Equation 11 and an SLNR of Equation 12 has been described with reference to FIGS. 2 and 3.

In Equation 12, an SLNR of an $M_s$th SU is merely dependent upon $w_{m_S}'$, and a solution for the SLNR of the $M_s$th SU may be an eigenvector corresponding to a maximum generalized eigenvalue of a matrix pair $P_{N(G^H)}{}^H H_{m_S}{}^H H_{m_S} P_{N(G^H)}$, $(P_{N(G^H)}{}^H H_{-m_S}{}^H H_{-m_S} P_{N(G^H)} + N_r \sigma_n^2 I)$. Here, $H_{-m_S} = [H_1; \ldots; H_{m_S-1}; H_{m_S-1}; \ldots; H_{M_S}]$.

Here, exemplary embodiments may use a generalized singular value decomposition (GSVD)-based algorithm based on a multi-user MIMO environment so as to effectively calculate a beamforming weight vector and to avoid a squaring operation, as opposed to iteratively performing a generalized eigen value decomposition (GEVD) with respect to all SUs so as to calculate beamforming weight vectors for all users.

Hereinafter, a method of calculating a beamforming weight vector of an SU through use of the GSVD-based algorithm is described.

Referring to FIG. 4 or FIG. 5, in a multi-user MIMO CR communication system including the CR base station and CR terminals, the CR base station may calculate, from an interference channel, an orthogonal projection matrix $P_{N(G^H)}$ to be used for removing interference on a primary user through use of a ZF processing scheme in operation 410 or 510. Equation 9 may be used to calculate the orthogonal projection matrix $P_{N(G^H)}$.

The CR base station may set an intermediate matrix K including an effective channel $HP_{N(G^H)}$ that is based on the orthogonal projection matrix $P_{N(G^H)}$, and noise $\sqrt{N_r}\sigma_n I$ among the CR terminals in operation 420 or 520.

For example, the intermediate matrix K may include the effective channel $HP_{N(G^H)}$ in an upper block, and may include the noise $\sqrt{N_r}\sigma_n I$ among CR terminals in a lower block, as shown in $$\begin{bmatrix} HP_{N(G^H)} \\ \sqrt{N_r}\sigma_n I \end{bmatrix} \in \Box^{(M_S N_r + N_t) \times N_t}.$$

When the CR base station performs QR decomposition on the intermediate matrix K in operation 430 or 530, the intermediate matrix K may be decomposed into $$\begin{bmatrix} P_\alpha \\ P_\beta \end{bmatrix} \overline{R}.$$

In this example, $P_\alpha \in \Box^{M_S N_r \times N_t}$ may be a sub-matrix of the calculated Q matrix. Here, $$Q = \begin{bmatrix} P_\alpha \\ P_\beta \end{bmatrix}.$$

Also, a right singular matrix $\overline{V}_{m_S}$ that is based on the sub-matrix $P_\alpha$ may be calculated in operation 440 or 540. In this example, the right singular matrix $\overline{V}_{m_S}$ may be obtained through performing singular value decomposition on $(P_\alpha)_{(m_S-1)N_r+1:m_S N_r}$.

$(P_\alpha)_{(m_S-1)N_r+1:m_S N_r}$ denotes a sub-matrix formed by rows of $P_\alpha$ from a $(m_S-1)N_r+1$th row to a $m_S N_r$th row.

Also, the singular value decomposition on $(P_\alpha)_{(m_S-1)N_r+1:m_S N_r}$ may be expressed by $(P_\alpha)_{(m_S-1)N_r+1:m_S N_r} = U_{m_S} \Sigma_{m_S} \overline{V}_{m_S}{}^H$. A matrix $U_{m_S}$ may be a left singular matrix and a matrix $\overline{V}_{m_S}$ may be a right singular matrix. $\Sigma_{m_S}$ may be a diagonal matrix that has a singular value as a diagonal element.

The CR base station may obtain a right singular vector $\overline{v}_{m_S,1}$ corresponding to a maximum singular value of the right singular matrix $\overline{V}_{m_S}$, and may obtain a beamforming weight vector $w_{m_S}$ for an $m_S$th SU through use of the right singular vector $\overline{v}_{m_S,1}$ and the orthogonal projection matrix $P_{N(G^H)}$ in operation 450 or 550.

The beamforming weight vector $w_{m_S}$ may be expressed by $P_{N(G^H)}\overline{R}^{-1}\overline{v}_{m_S,1}$. In this example, the right singular vector $\overline{v}_{m_S,1}$ may be a value corresponding to a first column of the right singular vector $\overline{V}_{m_S}$.

The CR base station may obtain a beamforming weight vector that maximizes an SLNR for each of the CR terminals, based on the orthogonal projection matrix.

Accordingly, the CR base station may obtain a beamforming weight vector through use of the GSVD-based algorithm that maximizes an SLNR for each of the CR terminals based on the orthogonal projection matrix and a singular vector corresponding to a maximum singular value of a matrix including noise among the CR terminals.

In the GSVD-based algorithm of FIG. 4 or 5, the ZF processing scheme may completely remove interference on the primary user from a transmitted signal of an SU. However, the ZF processing scheme may distort the transmitted signal of the SU.

Accordingly, to minimize the distortion of the transmitted signal of the SU, a beamforming weight vector may be obtained through use of the GSVD-based algorithm that maximizes an SLNR before the ZR processing scheme is performed.

In this example, when the beamforming weight vector satisfies an interference constraint at a predetermined primary user, an interference channel $G^H$ may not need to be projected to a null space with respect to the predetermined primary user and thus, the distortion from the ZF processing scheme may be reduced.

A communication method for the CR base station that reduces distortion from the ZR processing scheme will be described with reference to FIG. 6.

Figure 6:
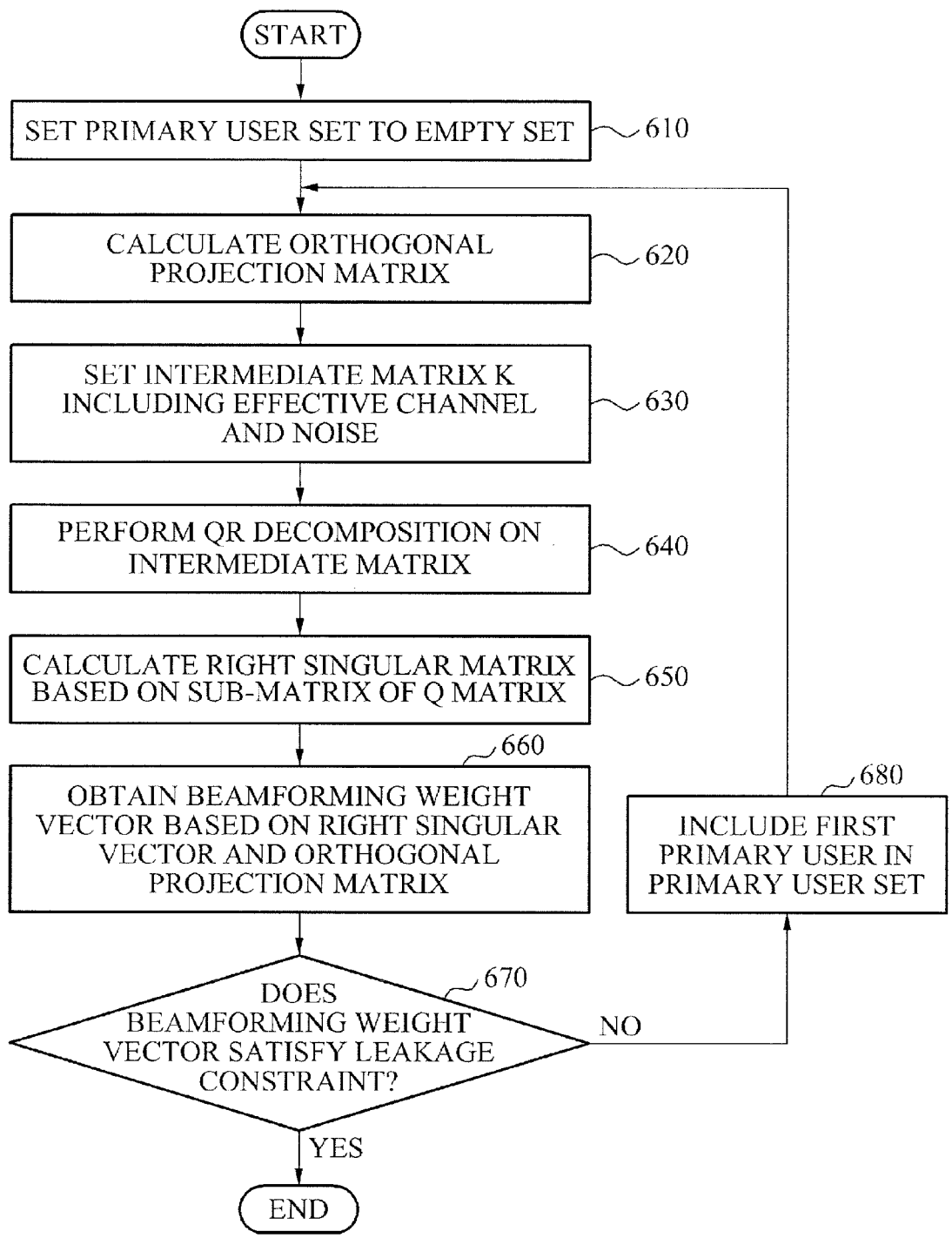
FIG. 6 is a flowchart illustrating a communication method for a CR base station in multi-user MIMO CR communication system according to another embodiment of the present invention.
Figure 7:
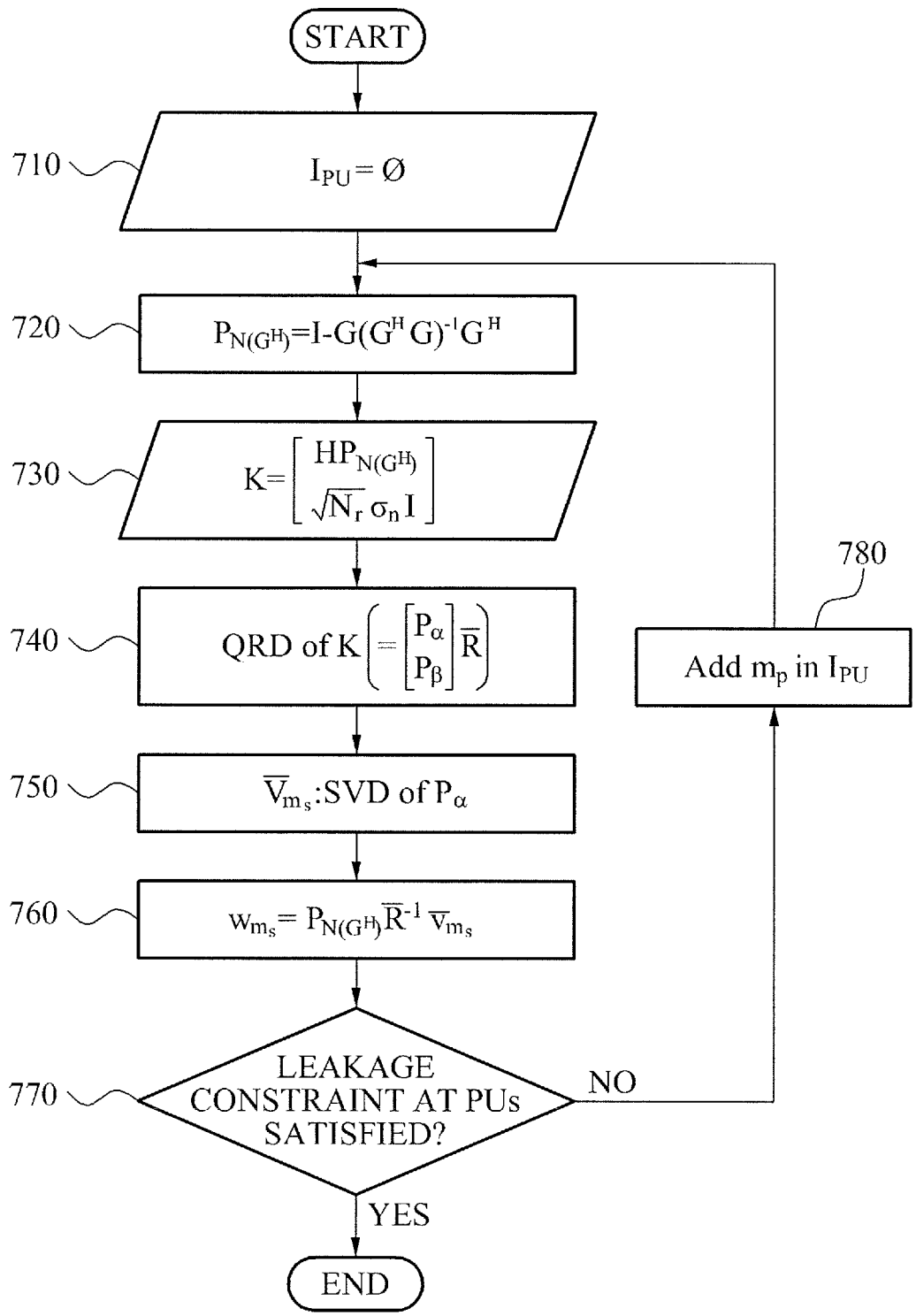
FIG. 7 is a flowchart illustrating the communication method of FIG. 6 in equation form.

FIG. 6 illustrates a communication method for a CR base station in multi-user MIMO CR communication system according to another embodiment of the present invention. FIG. 7 illustrates the communication method of FIG. 6 based on equations.

As described in the foregoing, the communication method for the CR base station may require iteration. A number of iterations may correspond to a maximum number of primary users. Accordingly, a fewer number of iterations may be performed than a number of iterations required for calculation in a general beamforming algorithm that maximizes an SINR.

Hereinafter, the communication method for the CR base station in the multi-user MIMO CR system including the CR base station and CR terminals is provided.

First, the CR base station may set a set $I_{PU}$ of primary users to an empty set ($\emptyset$.) in operation 610 or 710.

Subsequently, the CR base station may calculate an orthogonal projection matrix $P_{N(G^H)}$ based on an interference channel G with respect to a first primary user included in the set $I_{PU}$ of the primary users.

The CR base station may set an intermediate matrix K including an effective channel $HP_{N(G^H)}$ that is based on the orthogonal projection matrix $P_{N(G^H)}$, and noise $\sqrt{N_r}\sigma_n I$ among CR terminals in operation 630 or 730.

For example, the intermediate matrix K may be expressed by $$\begin{bmatrix} HP_{N(G^H)} \\ \sqrt{N_r}\sigma_n I \end{bmatrix} \in \square^{(M_S N_r + N_t) \times N_t}.$$

The CR base station may perform QR decomposition on the intermediate matrix K in operation 640 or 740 and thus, may calculate a sub-matrix $(P_\alpha)_{(m_S-1)N_r+1:m_S N_r}$ of a Q matrix and may calculate a right singular matrix $\overline{V}_{m_S}$ that is based on the sub-matrix $(P_\alpha)_{(m_S-1)N_r+1:m_S N_r}$ of the Q matrix in operation 650 or 750.

In this example, singular value decomposition of $(P_\alpha)_{(m_S-1)N_r+1:m_S N_r}$ may be expressed by $(P_\alpha)_{(m_S-1)N_r+1:m_S N_r} = \overline{U}_{m_S} \overline{\Sigma}_{m_S} \overline{V}_{m_S}^H$. A matrix may be a left singular matrix and $\overline{V}_{m_S}$ may be a right singular matrix, and $\overline{\Sigma}_{m_S}$ may be a diagonal matrix that has a singular value as a diagonal element.

The CR base station may obtain a right singular vector $\overline{v}_{m_S}, 1$ corresponding to a maximum singular value of the right singular matrix $\overline{V}_{m_S}$, and may obtain a beamforming weight vector $w_{m_S}$ through use of the right singular vector $\overline{v}_{m_S}, 1$ and the orthogonal projection matrix $P_{N(G^H)}$ in operation 660 or 760.

The beamforming weight vector $w_{m_S}$ may correspond to $P_{N(G^H)} \overline{R}^{-1} \overline{v}_{m_S}, 1$.

The right singular vector $\overline{v}_{m_S}, 1$ may correspond to a value of a first column of the right singular matrix $\overline{V}_{m_S}$.

The CR base station may obtain a beamforming weight vector that maximizes an SLNR for each of the CR terminals, based on an orthogonal projection matrix.

The CR base station may determine whether the obtained beamforming weight vector $w_{m_S}$ satisfies a corresponding leakage constraint generated from each primary user due to the beamforming weight vector $w_{m_S}$ for each of the CR terminals in operation 670 or 770.

The CR base station may include a first primary user $m_P$ in the set $I_{PU}$ of the primary users, based on a result of the determination in operation 680 or 780. In this example, the first primary user $m_P$ may be a primary user having a maximum leakage power.

That is, when beamforming weight vector $w_{m_S}$ satisfies leakage constraints at all the primary users in operation 670 or 770, the CR base station may complete the corresponding process. Conversely, when the beamforming weight vector $w_{m_S}$ for each of the CR terminals fails to satisfy the leakage constraints, the CR base station may include the first primary user $m_P$ in the set $I_{PU}$ of the primary users, and may proceed with operation 620 or 720 so as to calculate an orthogonal projection matrix based on an interference channel G with respect to the first primary user included in the updated set $I_{PU}$ of the primary users. Subsequently, the CR base station may iteratively perform operations 630 through 660 or operations 730 through 760 based on the orthogonal projection matrix, so as to update the beamforming weight vector ($w_{m_S}$).

The updated beamforming weight vectors satisfy the leakage constraints, the process may be terminated. Otherwise, operation 680 and operations 620 through 670, or operation 780 and operations 720 through 770 may be iteratively performed.

Figure 8:
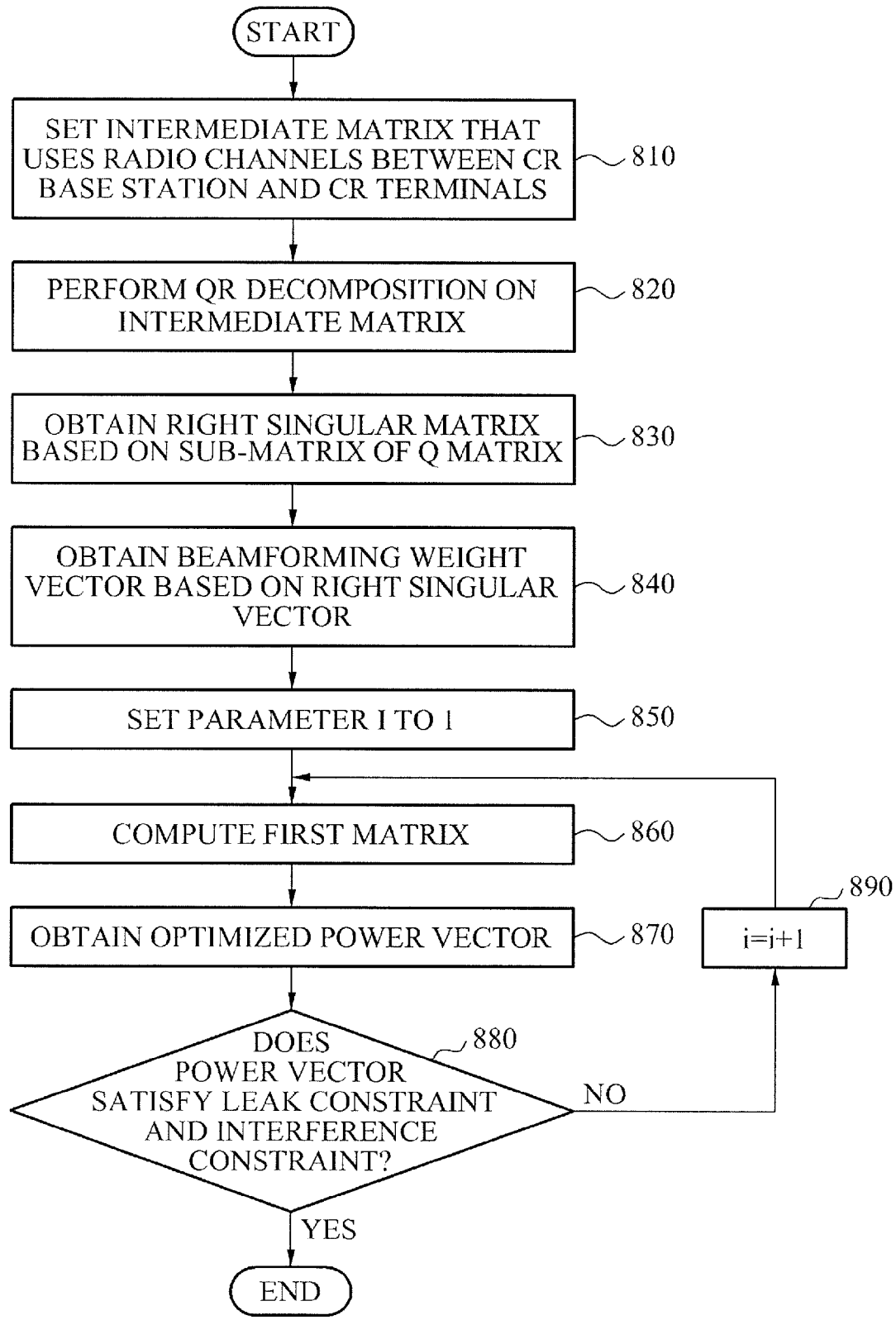
FIG. 8 is a flowchart illustrating a communication method for a CR base station in a multi-user MIMO CR communication system according to still another embodiment of the present invention.
Figure 9:
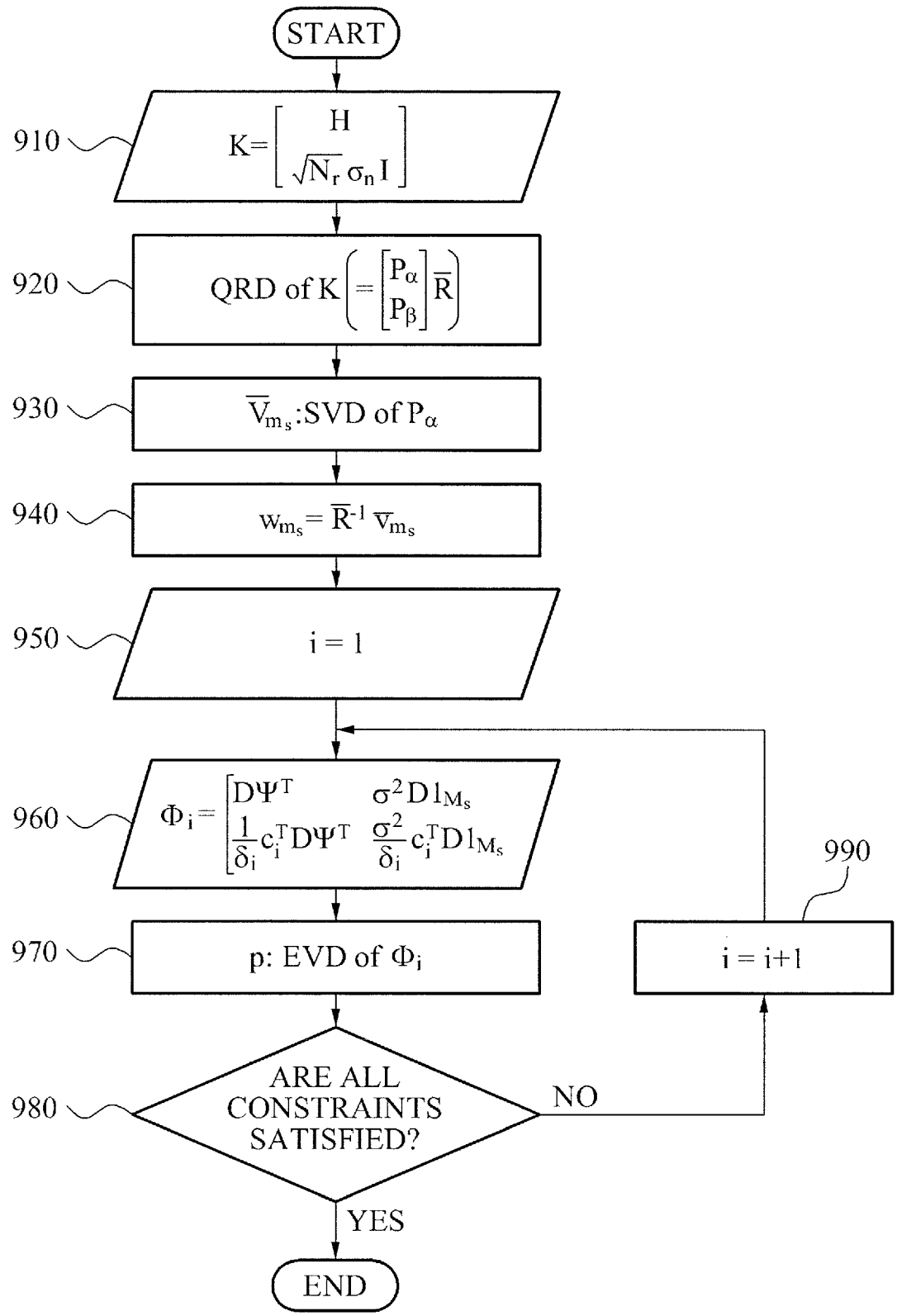
FIG. 9 is a flowchart illustrating the communication method of FIG. 8 in equation form.

FIG. 8 illustrates a communication method for a CR base station in a multi-user MIMO CR communication system according to still another embodiment of the present invention. FIG. 9 illustrates the communication method of FIG. 8 based on equations.

It is assumed that a transmission beamforming weight vector for each SU has the same power so as to satisfy Equation 4 corresponding to a constraint with respect to a transmitted signal power. That is, it is assumed that $$\|w_{m_S}\|^2 = \frac{P_T}{M_S}.$$

However, a beamforming weight vector may be obtained through use of a GSVD-based algorithm, as opposed to using a ZF processing scheme, and a weight power of each SU may be adjusted so as to satisfy an interference constraint for a primary user.

First, a power vector for each user is $p = [p_1, \ldots, p_{M_S}]$.

An SINK of an th SU may be expressed by Equation 13, through use of the beamforming weight vector $w_{m_S}$ obtained using the GSVD-algorithm, as opposed to using the ZF scheme.

$$SINR_{m_S} = \frac{p_{m_S} |\overline{w}_{m_S}^H H_{m_S} w_{m_S}|^2}{\sum_{\substack{m=1 \\ m \neq m_S}}^{M_S} p_m |\overline{w}_{m_S}^H H_{m_S} w_m|^2 + \sigma_n^2} \quad \text{[Equation 13]}$$

That is, a problem for calculating a power vector p may be considered a problem in calculation of p that maximizes an SINR when several linear constraints are given.

$$\underset{m_S}{\text{maximize min}} \frac{p_{m_S} |\overline{w}_{m_S}^H H_{m_S} w_{m_S}|^2}{\sum_{\substack{m=1 \\ m \neq m_S}}^{M_S} p_m |\overline{w}_{m_S}^H H_{m_S} w_m|^2 + \sigma_n^2} \quad (13\text{-}1)$$

$$\text{subject to } \sum_{m_S=1}^{M_S} p_{m_S} \leq P_T,$$

$$\sum_{m_S=1}^{M_S} p_{m_S} |g_{m_P}^H w_{m_S}|^2 \leq \Gamma_{m_P}, m_P = 1, \ldots, M_P \quad (13\text{-}2)$$

When it is assumed that a single linear constraint is given and $SINR_1 = SINR_2 = \ldots = SINR_{M_S}$ to simplify the problem, a closed-form solution may be derived through use of a single equality for the constraint.

For example, when it is assumed that a transmission power condition for a secondary base station is given as shown in a constraint 13-1, Equations 14 and 15 may be obtained.

$$SINR_1 = SINR_2 = \ldots = SINR_{M_S} = C_{SiNR}$$

In Equation 14, $C_{SINR}$ denotes a constant.

$$\sum_{m_S=1}^{M_S} p_{m_S} = P_T \Rightarrow c_1^T p = \delta_1 \quad \text{[Equation 15]}$$

In Equation 15, $c_1 = 1_{M_S}$ and $\delta_1 = P_T$. $1_{M_S}$ denotes a $M_S \times 1$ vector of which all elements are 1.

Also, Equations 16 and 17 may be obtained from Equations 14 and 15, respectively.

$$\frac{1}{C_{SINR}} p = D\Psi^T p + \sigma^2 D 1_{M_S} \quad \text{[Equation 16]}$$

$$\frac{1}{C_{SINR}} = \frac{1}{\delta_1} c_1^T D\Psi^T p + \frac{1}{\delta_1} \sigma^2 c_1^T D 1_{M_S} \quad \text{[Equation 17]}$$

Here, $D^{-1}$ may be expressed by Equation 18.

$$D^{-1} = \begin{bmatrix} |\bar{w}_1^H H_1 w_1|^2 & & 0 \\ & \ddots & \\ 0 & & |\bar{w}_{M_S}^H H_{M_S} w_{M_S}|^2 \end{bmatrix}, \quad \text{[Equation 18]}$$

Here, $$[\Psi]_{ik} = \begin{cases} |\bar{w}_k^H H_k w_i|^2, & i \neq k \\ 0, & i = k. \end{cases}$$

When Equations 16 and 17 are combined through Equation 18, Equation 19 may be obtained.

$$\frac{1}{C_{SINR}} \begin{bmatrix} p \\ 1 \end{bmatrix} = \Phi_1 \begin{bmatrix} p \\ 1 \end{bmatrix}, \quad \text{[Equation 19]}$$

$$\Phi_1 = \begin{bmatrix} D\Psi^T & \sigma^2 D 1_{M_S} \\ \frac{1}{\delta_1} c_1^T D\Psi^T & \frac{\sigma^2}{\delta_1} c_1^T D 1_{M_S} \end{bmatrix}$$

In this example, a solution of Equation 19 may be obtained through an eigenvector corresponding to a maximum eigenvalue of $\Phi_1$. Here, the solution is obtained under an assumption of the single constraint 13-1. $c_i$ and $\delta_i$ may be defined for a constraint 13-2, as shown in Equations 15 and 20.

$$c_i = \begin{bmatrix} |g_{i-1}^H w_1|^2 \\ \vdots \\ |g_{i-1}^H w_{M_S}|^2 \end{bmatrix}, \quad \text{[Equation 20]}$$

$$\delta_i = \Gamma_{i-1}, \text{ for}$$

$$i = 2, \ldots, M_P + 1.$$

A solution may be obtained by solving an eigenvalue problem through use of the above described equations, as expressed by Equation 21.

$$\frac{1}{C_{SINR}} \begin{bmatrix} p \\ 1 \end{bmatrix} = \Phi_i \begin{bmatrix} p \\ 1 \end{bmatrix}, \quad \text{[Equation 21]}$$

$$\Phi_i = \begin{bmatrix} D\Psi^T & \sigma^2 D 1_{M_S} \\ \frac{1}{\delta_i} c_i^T D\Psi^T & \frac{\sigma^2}{\delta_i} c_i^T D 1_{M_S} \end{bmatrix}$$

In this example, among solutions that satisfy a single constraint, a solution that simultaneously satisfies another constraint may exist, solely. Accordingly, after obtaining a solution for the single constraint, whether the solution satisfies the other constraint may be determined.

When the solution satisfies the single constraint and the other constraint, the solution may be a solution for multiple constraints, for example, the constraints 13-1 and 13-2 for Equation 13. Otherwise, an eigenvalue problem of Equation 20 may be repeatedly solved until a solution satisfying constraints is obtained.

Hereinafter, a method for the CR base station that satisfies an interference constraint for a primary user by calculating a beamforming weight vector through use of a GSVD-based algorithm and adjusting a weight power of a SU in a multi-user MIMO CR communication system will be described.

The CR base station sets an intermediate matrix K that uses a radio channel H between a CR base station and CR terminals in operation 810 or 910.

The CR base station may perform QR decomposition on the intermediate matrix K, so as to compute a sub-matrix $(P_\alpha)_{(m_S-1)N_r+1:m_S N_r}$ of a Q matrix in operation 820 or 920.

The CR base station may obtain a right singular matrix $\overline{V}_{m_S}$ that is based on the sub-matrix $(P_\alpha)_{(m_S-1)N_r+1:m_S N_r}$ of the Q matrix in operation 830 or 930, and may obtain a beamforming weight vector $w_{m_S}$ through use of a right singular vector $\overline{v}_{m_S,1}$ corresponding to a maximum singular value of the right singular matrix $\overline{V}_{m_S}$ in operation 840 or 940.

The process described through operations 810 through 840 or operations 910 through 940 may be referred to as a GSVD-based algorithm.

The CR base station may set, to 1, a parameter i indicating a number of iterations in operation 850 or 950. Here, the parameter i may be an index indicating $c_i$ and $\delta_i$ in Equations 15 and 20.

The CR base station may compute a first matrix $\Phi_i$ defined based on SINRs with respect to the beamforming weight vectors and power vectors of the CR terminals, through use of $c_i$ and $\delta_i$ in an $i^{th}$ iteration in operation 860 or 960.

The CR base station may compute an eigenvector of the first matrix $\Phi_i$, and may obtain a power vector p optimized for each of the CR terminals based on the obtained the eigenvector in operation 870 or 970.

The CR base station may determine whether the power vector (p) satisfies a leakage constraint and an interference constraint with respect to a primary user in operation 880 or 980.

The CR base station may update the first matrix $\Phi_i$ by increasing the parameter i by 1 when the power vector (p) fails to satisfy the leakage constraint and the interference constraint in operations 890 and 860 or operations 990 and 960.

The CR base station may compute an eigenvector of the updated first matrix, and may update the power vector p optimized for each of the CR terminals through use of the computed eigenvector in operation 870 or 970.

That is, the CR base station may not use a ZF scheme based on radio channels $H_{m_S}$ between the CR base station and the CR terminals, and may obtain a beamforming weight vector $w_{m_S}$ for each of the CR terminals through use of the GSVD-based algorithm and may set the parameter i to 1.

Subsequently, the CR base station may compute the first matrix $\Phi_i$ defined based on power vectors and SINRs with respect to beamforming weight vector of the CR terminals. The CR base station may determine whether a power vector optimized for each of the CR terminals, which is obtained based on a solution of a problem for an eigenvalue of the first matrix $\Phi_i$, satisfies a leakage constraint and an interference constraint with respect to a user. The CR base station may update the eigenvalue of the first matrix $\Phi_i$ based on a result of the determination, and may determine whether to adjust the power vector based on the updated eigenvalue of the first matrix.

Figure 10:
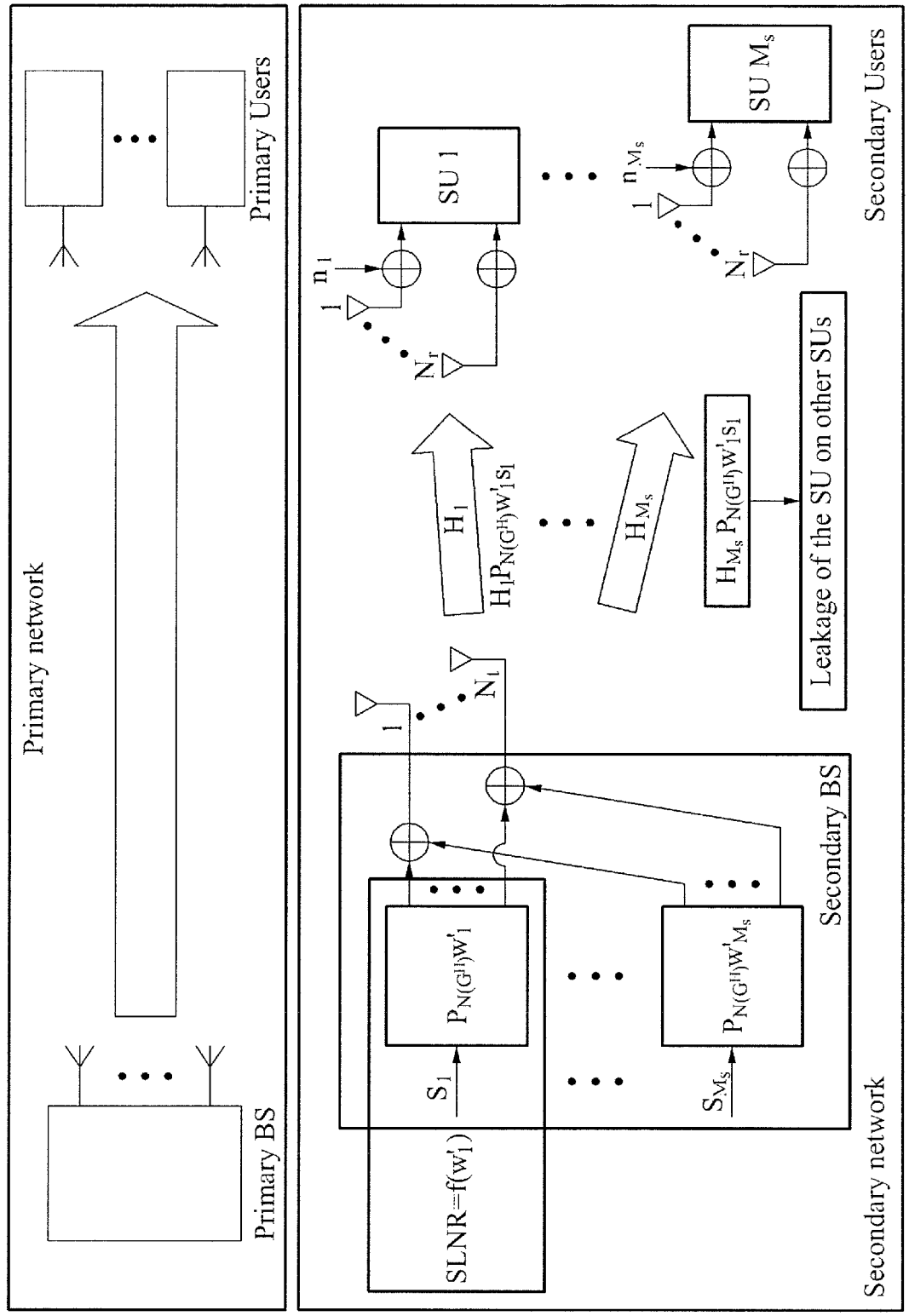
FIG. 10 is a diagram illustrating a beamforming process through use of an a generalized singular value decomposition (GSVD)-based algorithm for a CR network according to an embodiment of the present invention.

FIG. 10 illustrates a beamforming process through use of a GSVD-based algorithm for a CR network according to an embodiment of the present invention.

Referring to FIG. 10, interference from a secondary base station on a primary network may be prevented through a ZF processing scheme, and a beamforming weight vector that maximizes a SLNR may be obtained through GSVD and may be transmitted and received.

In this example, a power allocation scheme may be used instead of the ZF processing scheme so as to prevent the CR base station from sending interference on the primary network.

Figure 11:
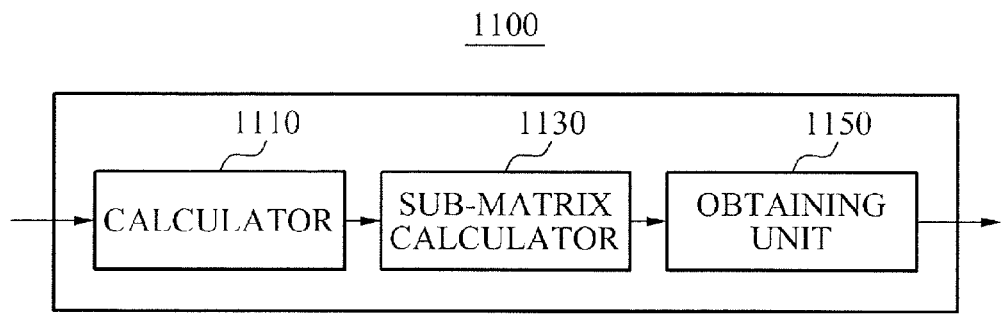
FIG. 11 is a block diagram illustrating a CR base station in a multi-user MIMO CR system according to an embodiment of the present invention.

FIG. 11 illustrates a CR base station 1100 in a multi-user MIMO CR system according to an embodiment of the present invention.

In the multi-user MIMO CR communication system including the CR base station 1100 and CR terminals, the CR base station 1100 may include a calculator 1110, a sub-matrix calculator 1130, and an obtaining unit 1150.

The calculator 1110 may calculate, from an interference channel, an orthogonal projection matrix to be used for removing interference on a primary user, through use of a ZF processing scheme.

The sub-matrix calculator 1130 may obtain a beamforming weight vector for each of the CR terminals, through use of the orthogonal projection matrix.

The sub-matrix calculator 1130 may perform QR decomposition on an intermediate matrix including an effective channel that is based on the orthogonal projection matrix, and noise among the CR terminals, so as to compute a sub-matrix of a Q matrix.

The obtaining unit 1150 may obtain a beamforming weight vector through use of a right singular matrix that is based on the sub-matrix of the Q matrix.

Detailed operations of the CR base station 1100 have been described with reference to FIGS. 4 and 5, and as such, repeated descriptions will be omitted for conciseness and ease of description.

Figure 12:
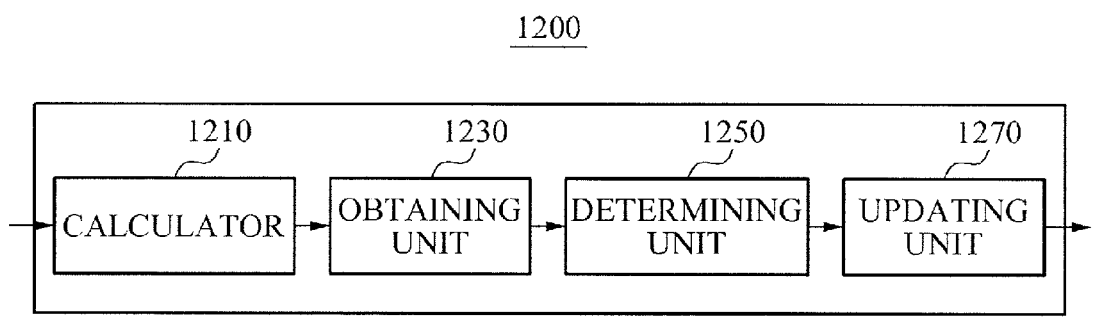
FIG. 12 is a block diagram illustrating a CR base station in a multi-user MIMO CR system according to another embodiment of the present invention.

FIG. 12 illustrates a CR base station 1200 in a multi-user MIMO CR system according to another embodiment of the present invention.

In the multi-user MIMO CR communication system including the CR base station 1200 and CR terminals, the CR base station 1200 may include a calculator 1210, an obtaining unit 1230, a determining unit 1250, and an updating unit 1270.

The calculator 1210 may calculate an orthogonal projection matrix based on an interference channel with respect to a first primary user included in a set of primary users.

The obtaining unit 1230 may obtain a beamforming weight vector for each of the CR terminals, based on the orthogonal projection matrix.

The determining unit 1250 may determine whether each beamforming weight vector satisfies a corresponding leakage constraint. In this example, leakage constraints are generated from all primary users due to the beamforming weight vectors.

The updating unit 1270 may calculate an orthogonal projection matrix for the first primary user that fails to satisfy a corresponding leakage constraint, and may update the beamforming weight vectors through use of the orthogonal projection matrix for the first primary user.

Detailed operations of the CR base station 1200 have been described with reference to FIGS. 6 and 7, and as such, repeated descriptions will be omitted for conciseness and ease of description.

Figure 13:
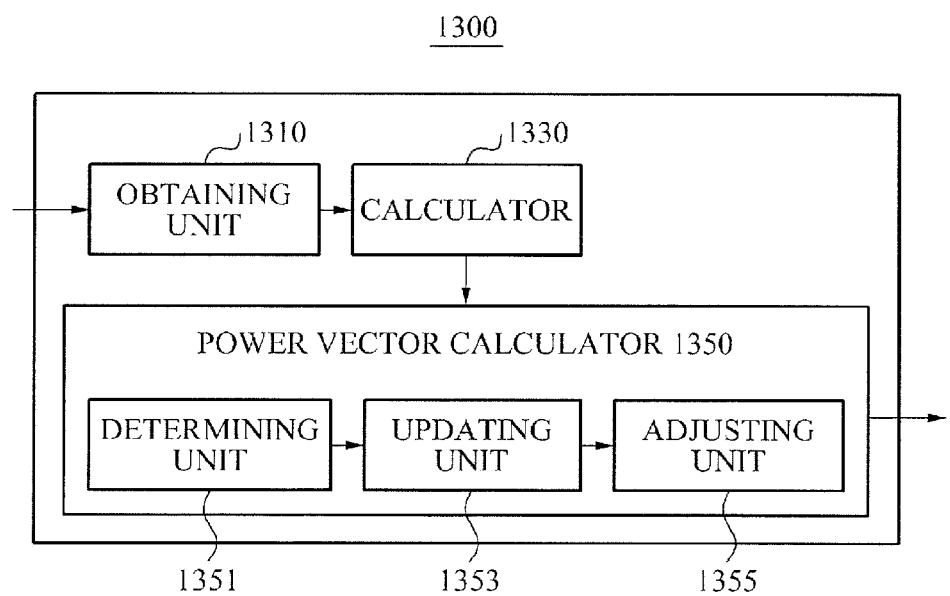
FIG. 13 is a block diagram illustrating a CR base station in a multi-user MIMO CR system according to still another embodiment of the present invention.

FIG. 13 illustrates a CR base station 1300 in a multi-user MIMO CR system according to still another embodiment of the present invention.

In the multi-user MIMO CR communication system including the CR base station 1300 and CR terminals, the CR base station 1300 may include an obtaining unit 1310, a calculator 1330, and a power vector calculator 1350.

The obtaining unit 1310 may obtain a beamforming weight vector for each of the CR terminals, based on radio channels between the CR base station and the CR terminals.

The calculator 1330 may compute a first matrix defined based on power vectors and SINRs with respect to beamforming weight vectors of the CR terminals.

The power vector calculator 1350 may obtain a power vector optimized for each of the CR terminals, based on the first matrix.

The power vector calculator 1350 may include a determining unit 1351, an updating unit 1353, and an adjusting unit 1355.

The determining unit 1351 may determine whether the power vector satisfies a leakage constraint and an interference constraint with respect to a primary user.

The updating unit 1353 may update the first matrix based on a result of the determination by the determining unit 1351.

The adjusting unit 1355 may adjust the power vector for each of the CR terminals based on an eigenvector of the updated first matrix.

Detailed operations of CR base station 1300 have been described with reference to FIGS. 8 and 9, and as such, repeated descriptions will be omitted for conciseness and ease of description.

The method according to the above-described embodiments of the present invention may be recorded in non-transitory computer readable media including program instructions to implement various operations embodied by a computer. The media may also include, alone or in combination with the program instructions, data files, data structures, and the like. Examples of non-transitory computer readable media include magnetic media such as hard disks, floppy disks, and magnetic tape: optical media such as CD ROM discs and DVDs; magneto-optical media such as floptical discs; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules in order to perform the operations of the above-described embodiments of the present invention, or vice versa.

Although a few embodiments of the present invention have been shown and described, the present invention is not limited to the described embodiments. Instead, it would be appreciated by those skilled in the art that changes may be made to these embodiments without departing from the principles and spirit of the invention, the scope of which is defined by the claims and their equivalents.

What is claimed is:

1. A communication method for a cognitive radio (CR) base station in a multi-user multiple-input multiple-output (MIMO) CR communication system including the CR base station and CR terminals, the method comprising:
calculating, from an interference channel, an orthogonal projection matrix to be used for removing interference on a primary user through use of a zero forcing (ZF) processing scheme; and
obtaining a beamforming weight vector for each of the CR terminals, through use of the orthogonal projection matrix,
wherein the obtaining comprises obtaining a beamforming vector using a generalized singular value decomposition (GSVD)-based algorithm that maximized signal-to-leakage-and noise ratio (SNLR) for each of the CR terminals, through use of the orthogonal projection matrix.

2. The method of claim 1, further comprising:
setting an intermediate matrix including an effective channel that is based on the orthogonal projection matrix, and noise among the CR terminals,
wherein the obtaining comprises:
obtaining the beamforming weight vector based on the intermediate matrix.

3. The method of claim 2, further comprising:
computing a sub-matrix of a Q matrix by performing QR decomposition on the intermediate matrix including an effective channel that is based on the orthogonal projection matrix, and noise among the CR terminals,
wherein the obtaining comprises:
obtaining the beamforming weight vector through use of a right singular matrix that is based on the sub-matrix of the Q matrix.

4. The method of claim 3, wherein the obtaining comprises:
obtaining the beamforming weight vector based on the right singular matrix and the orthogonal projection matrix.

5. The method of claim 3, wherein the obtaining comprises:
obtaining a right singular vector corresponding to a maximum singular value of the right singular matrix; and
obtaining the beamforming weight vector based on the right singular vector and the orthogonal projection matrix.

6. The method of claim 1, wherein the obtaining comprises:
obtaining the beamforming weight vector that maximizes a signal-to-leakage-and noise ratio (SLNR) for each of the CR terminals, based on the orthogonal projection matrix.

7. The method of claim 6, wherein the obtaining comprises:
obtaining the beamforming weight vector that maximizes an SLNR for each of the CR terminals, based on the orthogonal projection matrix and a singular vector corresponding to a maximum singular value of a matrix including noise among the CR terminals.

8. A communication method for a cognitive radio (CR) base station in a multi-user multiple-input multiple-output (MIMO) CR communication system including the CR base station and CR terminals, the method comprising:
calculating an orthogonal projection matrix based on an interference channel with respect to a first primary user included in a set of primary users;
obtaining a beamforming weight vector for each of the CR terminals, based on the orthogonal projection matrix;
determining whether the beamforming weight vector satisfies a leakage constraint generated from each primary user due to the beamforming weight vector for each of the CR terminals; and
calculating an orthogonal projection matrix with respect to a first primary user that fails to satisfy a leakage constraint based on a result of the determination, and updating the beamforming weight vector through use of the orthogonal projection matrix with respect to the first primary user,
wherein the obtaining comprises:
obtaining the beamforming weight vector that maximizes a signal-to-leakage-and noise ratio (SLNR) for each of the CR terminals, based on the orthogonal projection matrix.

9. The method of claim 8, wherein the updating comprises:
calculating the orthogonal projection matrix based on a vector value corresponding to the first primary user when the beamforming weight vector for each of the CR terminals fails to satisfy a corresponding leakage constraint; and
updating the beamforming weight vector based on the calculated orthogonal projection matrix.

10. The method of claim 8, wherein the updating comprises:
updating the set of primary users by adding the first primary user to the set of primary users when the beamforming weight vector for each of the CR terminals fails to satisfy a corresponding leakage constraint;
recalculating the orthogonal projection matrix based on an interference channel with respect to the first primary user included in the updated set of primary users; and
updating the beamforming weight vector based on the recalculated orthogonal projection matrix.

11. The method of claim 8, further comprising:
setting an intermediate matrix through use of an effective channel that is based on the orthogonal projection matrix, and noise among the CR terminals,
wherein the obtaining comprises:
obtaining the beamforming weight vector based on the intermediate matrix.

12. The method of claim 11, further comprising:
computing a sub-matrix of a Q matrix by performing QR decomposition on the intermediate matrix,
wherein the obtaining comprises:
obtaining the beamforming weight vector through use of a right singular matrix that is based on the sub-matrix of the Q matrix.

13. The method of claim 12, wherein the obtaining comprises:
obtaining the beamforming weight vector through use of the right singular matrix and the orthogonal projection matrix.

14. The method of claim 12, wherein the obtaining comprises:
obtaining a right singular vector corresponding to a maximum singular value of the right singular matrix; and
obtaining the beamforming weight vector based on the right singular vector and the orthogonal projection matrix.

15. A communication method for a cognitive radio (CR) base station in a multi-user multiple-input multiple-output (MIMO) CR communication system including the CR base station and CR terminals, the method comprising:
- obtaining a beamforming weight vector for each of the CR terminals, based on radio channels between the CR base station and the CR terminals;
- computing a first matrix defined based on signal-to-interference-and noise radios (SINRs) with respect to the beamforming weight vectors and power vectors of the CR terminals; and
- calculating a power vector optimized for each of the CR terminals, based on the first matrix,
- wherein the obtaining comprises:
  - determining whether the power vector satisfies a leakage constraint and an interference constraint with respect to a primary user;
  - updating the first matrix based on a result of the determination; and
  - adjusting the power vector for each of the CR terminals, based on an eigenvector of the updated first matrix.

16. The method of claim 15, further comprising:
setting an intermediate matrix based on the radio channels between the CR base station and the CR terminals, and noise among the CR terminals,
wherein the obtaining comprises:
obtaining the beamforming weight vector based on the intermediate matrix.

17. The method of claim 16, further comprising:
calculating a sub-matrix of a Q matrix by performing QR decomposition on the intermediate matrix,
wherein the obtaining comprises:
obtaining the beamforming weight vector through use of a right singular matrix that is based on the sub-matrix of the Q matrix.

18. The method of claim 17, wherein the obtaining comprises:
- obtaining a right singular vector corresponding to a maximum singular value of the right singular matrix; and
- obtaining the beamforming weight vector based on the right singular vector.

19. The method of claim 15, wherein the obtaining comprises obtaining a beamforming weight vector for each of the CR terminals using a generalized singular value decomposition (GSVD)-based algorithm, based on radio channels between the CR base station and the CR terminals.

* * * * *